(12) United States Patent
Zine et al.

(10) Patent No.: US 11,114,964 B2
(45) Date of Patent: Sep. 7, 2021

(54) METHOD FOR DETERMINING A DIRECT-AXIS INDUCTANCE AND A QUADRATURE-AXIS INDUCTANCE OF AN ELECTRIC MACHINE, CORRESPONDING COMPUTER PROGRAM AND DEVICE

(71) Applicant: VALEO SYSTEMES DE CONTROLE MOTEUR, Cergy Saint Christophe (FR)

(72) Inventors: Wided Zine, Cergy Saint Christophe (FR); Antoine Bruyere, Cergy Saint Christophe (FR); Pierre-Alexandre Chauvenet, Cergy Saint Christophe (FR)

(73) Assignee: VALEO SYSTEMES DE CONTROLE MOTEUR, Cergy Saint Christophe (FR)

( * ) Notice: Subject to any disclaimer, the term of this patent is extended or adjusted under 35 U.S.C. 154(b) by 166 days.

(21) Appl. No.: 16/472,188

(22) PCT Filed: Dec. 21, 2017

(86) PCT No.: PCT/FR2017/053787
§ 371 (c)(1),
(2) Date: Jun. 20, 2019

(87) PCT Pub. No.: WO2018/115772
PCT Pub. Date: Jun. 28, 2018

(65) Prior Publication Data
US 2020/0389111 A1 Dec. 10, 2020

(30) Foreign Application Priority Data
Dec. 21, 2016 (FR) ...................... 1662985

(51) Int. Cl.
*H02P 21/22* (2016.01)
*H02P 21/18* (2016.01)

(52) U.S. Cl.
CPC .............. *H02P 21/22* (2016.02); *H02P 21/18* (2016.02)

(58) Field of Classification Search
CPC ................................ H02P 21/18; H02P 21/22
See application file for complete search history.

(56) References Cited

U.S. PATENT DOCUMENTS 10,523,147 B2 * 12/2019 Nishimaki .............. H02P 21/18
10,944,346 B2 * 3/2021 Sankala .................. H02P 6/186
(Continued)

FOREIGN PATENT DOCUMENTS

WO 2010000640 A1 1/2010

OTHER PUBLICATIONS

Ji-Hoon Jang et al; "Analysis of Permanent Magnet Machine for Sensorless Control Based on High Frequency Signal Injection", Jul. 31, 2001, XP055407338.
(Continued)

*Primary Examiner* — Thai T Dinh
(74) *Attorney, Agent, or Firm* — JCIP; Joseph G. Chu; Jeremy I. Maynard

(57) ABSTRACT

A method for determining a direct inductance and a quadrature inductance of an electrical machine is included. The method includes controlling the electrical machine so that a stator generates a first magnetic field rotating at a first rotation frequency to rotationally drive a rotor of the electrical machine, and a second magnetic field that varies periodically at a second frequency for measuring a portion of the phase currents flowing through the stator windings of the electrical machine during controlling of the electrical machine. The method further includes determining an (Continued)

amplitude spectrum of a given electrical quantity determined based on a portion of the phase currents, searching in the amplitude spectrum for a peak present at a frequency that is dependent on the second frequency, determining an amplitude of each peak found, and determining the direct inductance and the quadrature inductance from the amplitudes of two peaks found.

12 Claims, 5 Drawing Sheets

(56) References Cited

U.S. PATENT DOCUMENTS

| | | | | |
|---|---|---|---|---|
| 2002/0113615 A1* | 8/2002 | Atarashi | ............... | B60L 15/025 318/400.01 |
| 2008/0079378 A1* | 4/2008 | Nakatsugawa | ......... | H02P 27/04 318/430 |
| 2011/0031909 A1* | 2/2011 | Ohgushi | ................. | H02P 21/16 318/400.02 |
| 2014/0232314 A1* | 8/2014 | Hachiya | .................. | H02P 21/16 318/490 |
| 2014/0292239 A1* | 10/2014 | Kato | ....................... | H02P 21/22 318/400.02 |
| 2016/0233807 A1* | 8/2016 | Rogg | ...................... | H02P 21/14 |

OTHER PUBLICATIONS

Marek Musak et al: "Novel Methods for Parameters Investigation of PM Synchronous Motors", Acta Technica Corviniensis—Bulletin of Engineering, Jan. 1, 2013 (Jan. 1, 2013), p. 51, XP055408307, Hunedoara.

Kaiyuan Lu et al: "Determination of High-Frequency d- and q-axis Inductances for Surface-Mounted Permanent-Magnet Synchronous Machines", IEEE Transactions on Instrumentation and Measurement., vol. 59, No. 9, Sep. 1, 2010 (Sep. 1, 2010), pp. 2376-2382, XP055407321, US ISSN: 0018-9456, DOI: 10.1109/TIM.2009.2034578.

International Search Report and Written Opinion of International Search Authority for International Application No. PCT/FR2017/053787.

French Search Report of Application No. FR1662985.

* cited by examiner

METHOD FOR DETERMINING A DIRECT-AXIS INDUCTANCE AND A QUADRATURE-AXIS INDUCTANCE OF AN ELECTRIC MACHINE, CORRESPONDING COMPUTER PROGRAM AND DEVICE

TECHNICAL FIELD

The present invention relates to the field of electrical machines, and in particular, synchronous electrical machines, with salient poles, for example.

BACKGROUND

The PCT request published under number WO 2010/000640 A1 discloses a method for determining the direct inductance $L_d$ and the quadrature inductance $L_q$ of an electrical machine, wherein the positive then negative voltage vectors are applied in the direction of each phase, the currents of the transient phases are measured, an angular position of the rotor is determined on the basis of the currents of the transient phases and the inductances $L_d$, $L_q$, are determined on the basis of the angular position of the rotor.

This method for determining the direct inductance $L_d$ and the quadrature inductance $L_q$ has the disadvantage of requiring the measurement of the phase currents at transient speeds, Such a measurement requires specific current sensors, as well as significant resources in terms of calculation times.

The purpose of the invention is to propose a method for determining the direct inductance $L_d$ and the quadrature inductance $L_q$ that does not require the measurement of phase currents at transient speeds.

SUMMARY

For this purpose, a method is proposed for determining a direct inductance and a quadrature inductance of an electrical machine, the method comprising:
at least one testing step comprising:
controlling the electrical machine such that a stator of the electrical machine generates a magnetic field comprising:
a first magnetic field rotating at a first rotation frequency, so as to rotationally drive a rotor of the electrical machine, and
a second magnetic field, called test magnetic field, that varies periodically at a second frequency, called test frequency, different from the rotation frequency,
measuring at least one portion of the phase currents flowing through the stator phase windings of the electrical machine during controlling of the electrical machine,
determining an amplitude spectrum of a given electrical quantity determined on the basis of at least some of the phase currents,
searching in the amplitude spectrum for at least one peak present at a frequency that is dependent on the test frequency,
determining the amplitudes of each peak found,
determining the direct inductance and the quadrature inductance from the amplitudes of two peaks found in the one or more testing steps.

The invention makes it possible to determine the direct inductance and the quadrature inductance on the basis of a spectral analysis of the electrical quantity coming from the phase currents, which implies that it is the established speed of the phase currents that is considered. In particular, the amplitude spectrum comes from a spectral analysis of an electrical quantity. For example, the two used peaks come either from one single testing step during which two peaks are sought in the amplitude spectrum, or from two testing steps during which one peak is sought in the amplitude spectrum.

Optionally, the test frequency is greater than the rotation frequency, preferably ten times greater.

Also optionally, the at least one testing step comprises a first testing step wherein the test magnetic field varies only in the direct direction of the first magnetic field.

Also optionally, during the first testing step, a peak is sought at the sum of the rotation frequency and the test frequency.

Also optionally, during the first testing step, controlling of the electrical machine comprises:
determining the phase voltage setpoints, called global setpoints, said global setpoints comprising setpoints, called testing setpoints, of which the application to the stator phase windings of the electrical machine is configured to generate the test magnetic field, the testing setpoints comprising a component in the direct direction, which is sinusoidal to the test frequency, and a component in the quadrature direction, which is zero,
the application of the phase voltage setpoints, respectively to the stator phase windings of the electrical machine.

Also optionally, the direct inductance is determined by the following equation:

$$L_d = \frac{V_h}{4\pi \ f_h I_{pul}}$$

where:
$I_{pul}$ is the amplitude of the peak found at the sum of the rotation frequency and at the test frequency,
$v_h$ and $f_h$ are respectively the amplitude and the frequency of the sinusoidal component in the direct direction of the testing setpoints.

Also optionally, the at least one testing step comprises a second testing step wherein the test magnetic field is a magnetic field rotating at the test frequency.

Also optionally, during the second testing step, a peak is sought at the test frequency.

Also optionally, during the second testing step, controlling of the electrical machine comprises the determination of the global setpoints of the phase voltages comprising testing setpoints, the application of which to the stator phase windings is configured to generate the test magnetic field, these testing setpoints comprising a component along a first axis of a fixed reference with respect to the stator, which is sinusoidal to the test frequency, and a component along a second axis of the fixed reference, which is co-sinusoidal to the test frequency.

Also optionally, the two components of the testing setpoints have the same test amplitude, and the quadrature inductance is determined with the following equation:

$$L_q = -\frac{V_h}{-4\pi \ f_h I_{rot} + \dfrac{V_h}{L_d}}$$

where:
- $I_{rot}$ is the amplitude of the peak found at the test frequency,
- $v_h$ and $f_h$ are respectively the amplitude and the frequency of the two components of the testing setpoints.

The invention also proposes a computer program that can be downloaded from a communication network and/or stored on a support that is readable by a computer and/or executable by a processor, wherein it comprises instructions for the execution of the steps of a method according to the invention, when said program is executed on a computer.

The invention also proposes a device for determining a direct inductance and a quadrature inductance of an electrical machine, the device comprising:
- a control module of an inverter designed to respectively provide phase voltages to the stator phase windings of the electrical machine, such that a stator of the electrical machine generates a magnetic field comprising:
  - a first magnetic field rotating at a rotation frequency so as to rotationally drive a rotor of the electrical machine, and
  - a second magnetic field, called test magnetic field, that varies periodically at a second frequency, called test frequency, different from the rotation frequency,
- a module for determining an amplitude spectrum with an electrical quantity determined from at least one portion of the phase currents flowing through the stator phase windings of the electrical machine during control of the electrical machine,
- a module for searching in the amplitude spectrum for at least one peak present at a frequency that is dependent on the test frequency and for determining an amplitude for each peak found,
- a module designed to determine the direct inductance and the quadrature inductance based on the amplitudes of the two peaks found.

DETAILED DESCRIPTION

Figure 1:
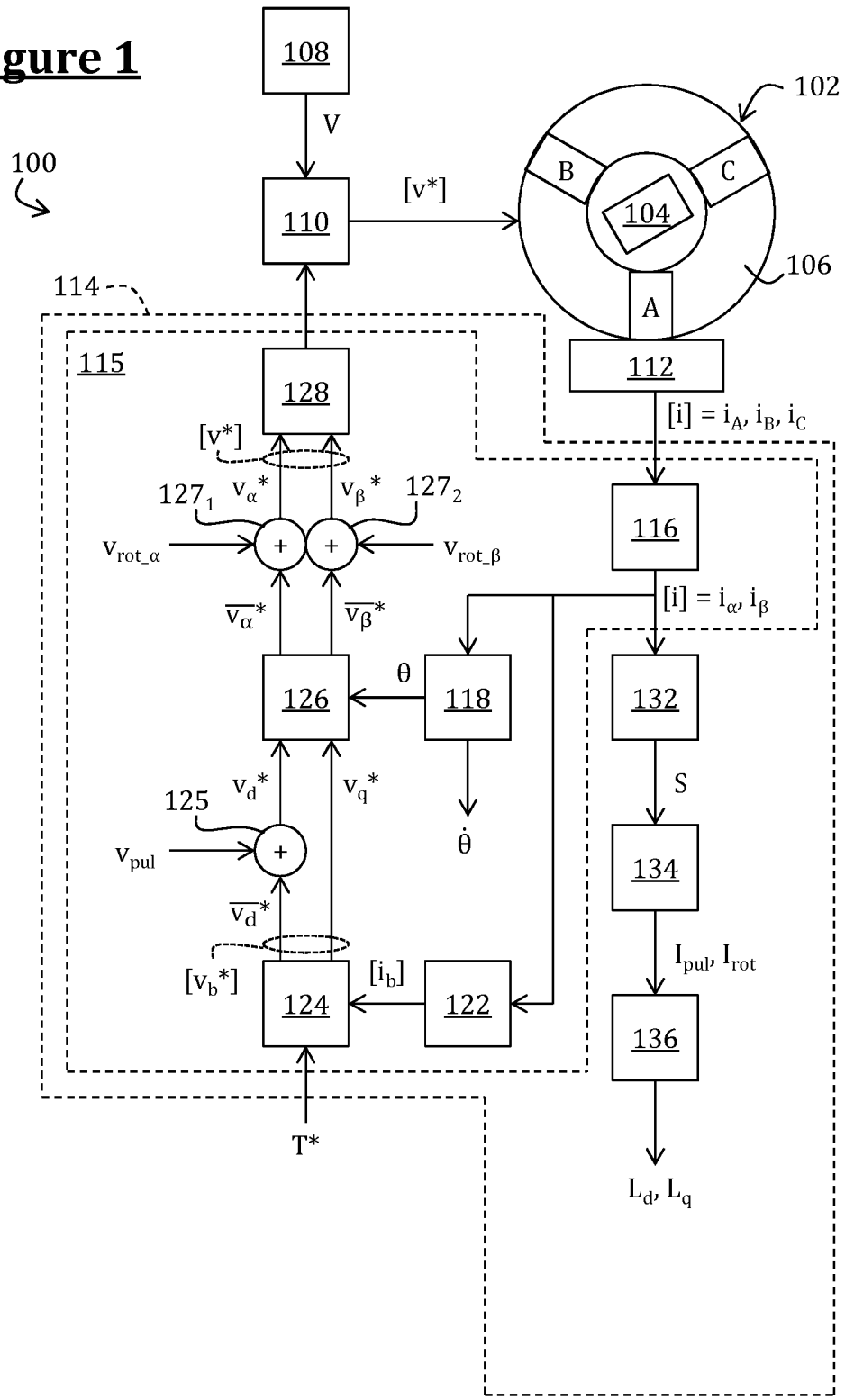
FIG. 1 is a functional diagram of an electric system according to the invention.

With reference to FIG. 1, an electric system 100 is now described.

Firstly, the electric system 100 comprises an electrical machine 102. In the described example, the electrical machine 102 is a synchronous electrical machine, for example with permanent magnets.

The synchronous electrical machine 102 comprises a rotor 104 and a stator 106 comprising, in the described example, three stator phase windings A, B, C. The rotor 104 is designed to rotate with respect to the stator 106 and has an angular position θ with respect to the stator 106.

The quantities associated with the stator phase windings A, B, C, i.e. the phase voltages, the phase currents, the corresponding setpoints, the inductances of the electrical machine 102, etc. can be expressed in several manners. They can be expressed in a natural form, i.e. by the set of physically measurable individual quantities, or in a reference associated with the stator 106 by two components only (when the electrical machine 102 is balanced) for example, in the α-β reference by the two components α and β obtained by a Clarke or a Concordia transformation for example, or in a rotating reference associated with the rotor 104 by two components only (when the electrical machine 102 is balanced), for example, in the d-q reference by the two components d and q obtained by a Park transformation, for example.

Thus, in the following description and claims, the quantities used will bear a reference in square brackets when they are mentioned independently from the manner of expressing them, and by the components expressing them, with indexes corresponding to the used representation, when they are mentioned in a specific representation.

For example, the phase currents are noted [i] when they are mentioned independently from the manner in which they are represented. However, they are referenced $i_A$, $i_B$, $i_C$ when they are expressed in the natural form thereof, $i_\alpha$, $i_\beta$ when they are expressed in the α-β reference, and $i_d$, $i_q$ when they are expressed in the d-q reference.

The electrical machine 102 has a direct inductance $L_d$ (also called: "d-axis inductance") and a quadrature inductance $L_q$ (also called: "q-axis inductance"). Preferably, the electrical machine 102 has salient poles, i.e. the direct inductance $L_d$ has a value that is different from the quadrature inductance $L_q$. The direct inductance $L_d$ and the quadrature inductance $L_q$ are components in a rotating reference associated with the rotor 104 that characterise the inductances of the electric motor 102 having stator phase windings A, B, C in a star connection. These inductances are inductances seen electrically by the inverter 110. The direct inductance $L_d$ and the quadrature inductance $L_q$ depend on the self-inductance and on the mutual inductance of each phase, which, in turn, depend on the angular position θ of the rotor 104. In the described example, the rotating reference is the d-q reference, i.e. with a "d" axis called "direct" oriented in the direction of a rotating magnetic field generated by the stator 106 to rotationally drive the rotor 104 and a "q" axis in quadrature with the direct axis. The direction of the rotating magnetic field of the stator 106 corresponds to the direction of the magnetic field of the rotor 104, as the magnetic field of the rotor 104 aligns on that of the stator 106.

The system 100 further comprises a direct voltage source 108 designed to provide a direct voltage V. In the described example, the direct voltage source 108 comprises a battery.

The system 100 further comprises an inverter 110 designed to respectively supply the stator phase windings A, B, C with the alternating phase voltages from the direct voltage source 108.

The system 100 further comprises a measurement device 112 designed to measure the phase currents [i]=$i_A$, $i_B$, $i_C$ flowing respectively through the stator phase windings A, B, C.

The system 100 further comprises a device 114 for determining the direct inductance $L_d$ and the quadrature inductance $L_q$ of the electrical machine 102.

The device 114 is designed to control the inverter 110 based on a torque setpoint T* so as to rotationally drive the rotor 104 with respect to the stator 106 at a rotation frequency $f_b$. Alternatively, the torque setpoint T* can be replaced by or include an angular speed setpoint $\dot{\theta}$* of the rotor 104.

The device 114 first comprises a control module 115 of the inverter 110.

The control module 115 first comprises a conversion module (a, b, c/α, β) 116 designed to express the phase currents [i]=$i_A$, $i_B$, $i_C$ in the reference α-β in the form of the components $i_α$, $i_β$.

The control module 115 further comprises an angular estimation module 118 designed to estimate the angular position θ and an angular speed $\dot{\theta}$ of the rotor 104 with respect to the stator 106 based on the phase currents [i]=$i_α$, $i_β$.

The control module 115 further comprises a setpoint module 124 designed to determine, based on the torque setpoint T*, setpoints, called main setpoints, [$v_b$*] of phase voltages. The main setpoints [$v_b$*] are configured to cause the stator 106 to generate a rotating magnetic field $B_b$ at a rotation frequency $f_b$ linked to the angular position θ by the equation: $2\pi f_b t=\theta$. In the described example, the main set points [$v_b$*] are expressed in the d-q reference in the form of components $\overline{v_d}$*, $v_q$*.

The control module 115 further comprises a module for estimating the main currents 122, designed to determine the phase currents, called main phase currents, [$i_b$] based on the phase currents [i]=$i_α$, $i_β$. The main phase currents [$i_b$] are the currents associated with the rotating magnetic field $B_b$, i.e. those that are present in the phase currents [i] at the rotation frequency $f_b$. The setpoint module 124 is designed to consider the main phase currents [$i_b$], in the described example, in the d-q reference in the form of the components $i_{b\_d}$, $i_{b\_q}$, to determine the main setpoints [$v_b$*]. A closed loop control is thus formed.

The control module 115 further comprises a pulsating injection module 125 designed to inject (i.e. to add) testing setpoints [$v_h$*] in the main setpoints [$v_b$*] to obtain setpoints that are called global setpoints [v*]. The testing setpoints [$v_h$*] injected by the pulsating injection module 125 are configured to cause the stator 106 to generate a magnetic field, called test magnetic field $B_h$, varying periodically at a frequency, called test frequency $f_h$. In the described example, the testing setpoints [$v_h$*] injected by the module 125 are expressed in the d-q reference by a direct component $v_{pul}$ varying periodically at the test frequency $f_h$ and a quadrature component that is nil. The direct component $v_{pul}$ is added to the component to provide the component $v_d$* of the global setpoints [v*]. Thus, the test magnetic field $B_h$ is configured to periodically vary at the test frequency $f_h$ in the direct direction of the rotating magnetic field $B_b$. In the described example, the direct component $v_{pul}$ varies sinusoidally in the direct direction and is provided by the following equation:

$$v_{pul}=V_h \cos(2\pi f_h t)$$

The control module 115 further comprises a conversion module 126 designed to convert the components $v_d$*, $v_q$* in the α-β reference in the form of two components $\overline{v_α}$*, $\overline{v_β}$*. For this conversion, it is necessary to know the angular position θ of the rotor 104, which is provided by the estimation module 118.

The control module 115 further comprises rotating injection modules $127_1$, $127_2$ designed to inject (i.e. to add) testing setpoints [$v_h$*] in the main setpoints [$v_b$*] to obtain global setpoints [v]. In the described example, a single injection, pulsating or rotating, occurs once so that the global setpoints [v] comprise the main setpoints and either the testing setpoints [$v_h$*] injected by the pulsating injection module 125, or the testing setpoints [$v_h$*] injected by the rotating injection modules $127_1$, $127_2$.

The testing setpoints [$v_h$*] injected by the rotating injection modules $127_1$, $127_2$ are configured to cause the stator 105 to generate a test magnetic field $B_h$, varying periodically at a test frequency $f_h$. In the described example, the testing setpoints [$v_h$*] injected by the modules $127_1$, $127_2$ are expressed in the α-β reference by a component α $v_{rot\_α}$ and a component $β_{vrot\_β}$ varying periodically at the test frequency $f_h$. The component $v_{rot\_α}$ is added to the component $\overline{v_α}$* and the component $v_{rot\_β}$ is added to the component $\overline{v_β}$* to provide respectively the components $v_α$*, $v_β$* of the global setpoints [v*]. Thus, the test magnetic field $B_h$ is configured to rotate at the test frequency $f_h$. In the described example, the components $v_{rot\_α}$, $v_{rot\_β}$ vary sinusoidally and are provided by the following equations:

$$v_{rot,α}=V_h \cos(w_h t)$$

$$v_{rot,β}=V_h \sin(w_b t)$$

In the described example, the characteristics (amplitude $v_h$ and frequency $f_h$) of the rotating injection are identical to that of the pulsating injection. However, according to other embodiments of the invention, they can be different. Furthermore, in the rotating injection, the amplitudes of the components $v_{rot\_α}$, $v_{rot\_β}$ can be different.

The control module 115 further comprises an output module 128 designed to control the inverter 110, such that the inverter 110 supplies respectively the phases A, B, C with the global setpoints [v*]=$v_A$*, $v_B$*, $v_C$*.

Under global setpoints, the stator 106 is designed to generate a magnetic field B comprising the superposition, on the one hand, of the magnetic field $B_b$ rotating at the rotation frequency $f_b$, coming from the main setpoints [$v_b$*] and, on the other hand, the test magnetic field $B_h$ varying at the test frequency $f_h$ coming from the testing setpoints [$v_h$*] injected either by the module 125, or by the modules $127_1$, $127_2$.

Preferably, the test frequency $f_h$ is different from the rotation frequency $f_b$, more preferably greater than the rotation frequency $f_b$, for example at least ten times greater. Also preferably, the rotation frequency $f_b$ is such that the rotation speed of the rotor 104 is less than 10% of the maximum rotation speed of the rotor 104 for the electrical machine 102 (this maximum speed being different from one electrical machine to the other). For example, the rotation frequency $f_b$ is between 0 Hz and 100 Hz and the test frequency $f_h$ is of at least 500 Hz.

The device 114 further comprises a spectral analysis module 132 designed to determine an amplitude spectrum S with a determined electrical quantity from at least one portion of the phase currents [i]=$i_A$, $i_B$, $i_C$. For example, the electrical quantity is one of the phase currents $i_A$, $i_B$, $i_C$, or one of the components $i_α$, $i_β$. In the described example, the electrical quantity is the component $i_α$.

Alternatively, the electrical quantity can be the norm |i| of the phase currents [i].

$$|i|=\sqrt{i_A^2+i_B^2+i_C^2}=\sqrt{i_α^2+i_β^2}$$

The device 114 further comprises a peak search module 134 designed to search, in the amplitude spectrum 5, for a peak present at a frequency that depends on the test frequency $f_h$. More specifically, the module 134 is designed to search for a peak present at the frequency $f_b+f_h$ in the case of a pulsating injection by the module 125, and at the frequency $f_h$ in the case of a rotating injection by the modules $127_1$, $127_2$. Furthermore, the peak search module 134 is designed to determine an amplitude of each found peak, referenced respectively $I_{pul}$ and $I_{rot}$.

The device 114 further comprises an inductance determination module 136 designed to determine, on the one hand, the direct inductance $L_d$ from the amplitude $I_{pul}$ and from the characteristics $v_h$, $f_h$ of the pulsating injection and, on the other hand, the quadrature inductance $L_q$ from the amplitude $I_{rot}$, the inductance $L_d$ and the characteristics $v_h$, $f_h$ of the rotating injection.

In the described example, the inductance $L_d$ is determined by the following equation:

$$L_d = \frac{V_h}{4\pi\, f_h I_{pul}}$$

where $I_{pul}$ is the amplitude of the peak found at the sum of the rotation frequency $f_b$ and of the test frequency $f_h$, and $v_h$ and $f_h$ are respectively the amplitude and the frequency of the component $v_{pul}$.

Furthermore, the inductance $L_q$ is determined by the following equation:

$$L_q = -\frac{V_h}{-4\pi\, f_h I_{rot} - \frac{V_h}{L_d}}$$

where $I_{rot}$ is the amplitude of the peak found at the test frequency $f_h$, $v_h$ and $f_h$ are respectively the amplitude and the frequency of the components $v_{rot\_\alpha}$, $v_{rot\_\beta}$.

In the described example, the device 114 comprises a computer system comprising a processing unit (not shown) and a memory (not shown) wherein is stored a computer program configured to be executed by the processing unit. Thus, all the modules described above are implemented in the described example in the form of computer modules of the computer program, configured to be executed by the processing unit.

Alternatively, all or some of these modules can be implemented materially, i.e. in the form of an electronic circuit that does not rely on a computer program.

Figure 2:
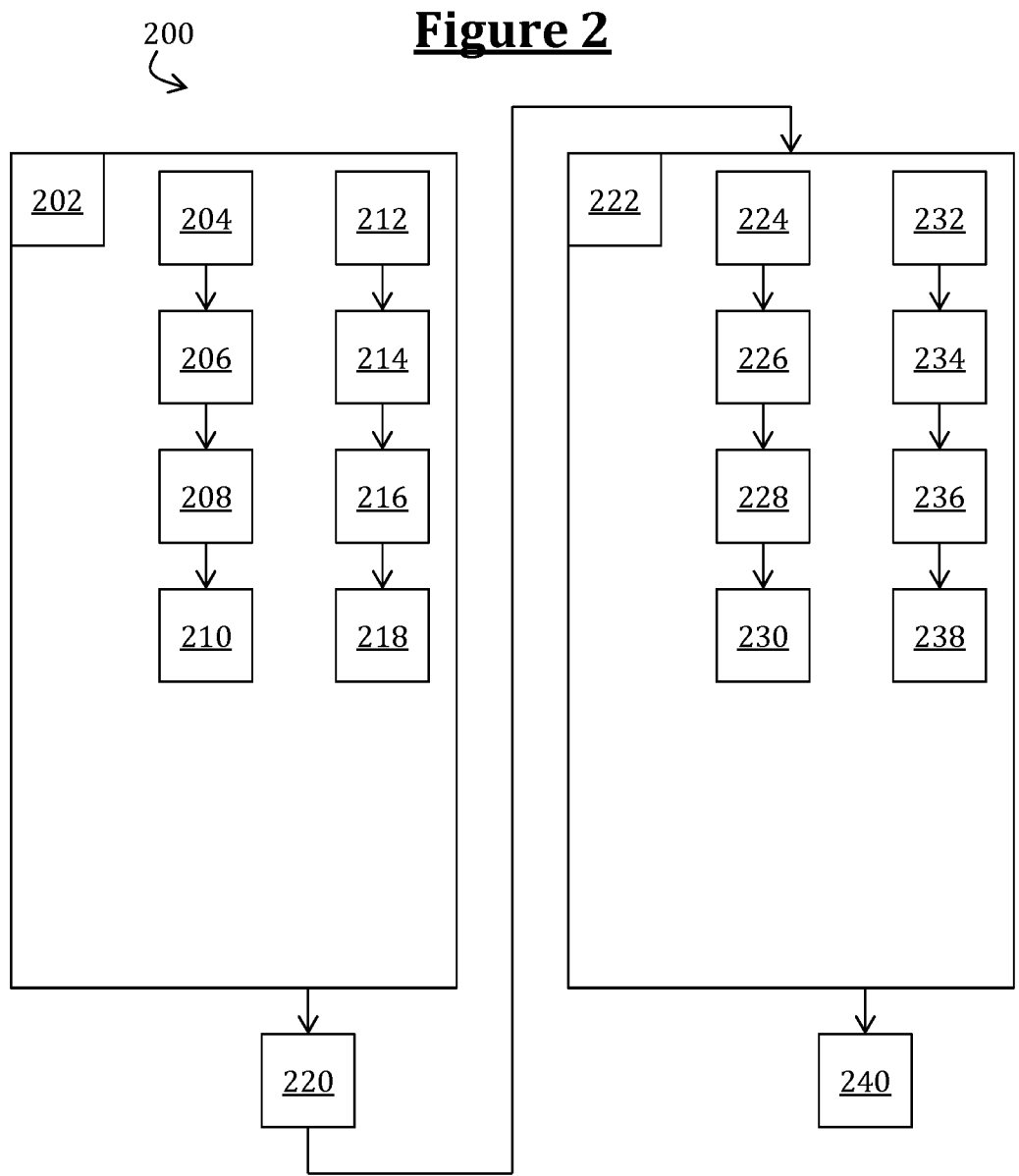
FIG. 2 is a block diagram of the steps of a method according to the invention for determining the direct inductance $L_d$ and the quadrature inductance $L_q$ for example implemented in the electrical system shown in FIG. 1.

With reference to FIG. 2, a method 200 for determining the direct inductance $L_d$ and the quadrature inductance $L_q$ is described below.

During a first testing step 202, the following steps 204 to 218 are performed.

During a step 204, the setpoint module 124 determines the main setpoints $[v_b^*]=\overline{v_d}^*, v_q^*$ based on a torque setpoint $T^*$.

During a step 206, the pulsating injection module 125 injects the testing setpoints $[v_h^*]$ in the main setpoints $[v_b^*]$ to obtain the global setpoints $[v^*]=v_d^*, v_q^*$. More specifically, the pulsating injection module 125 adds the component $v_{pul}$ to the component $\overline{v_d}^*$ obtain the component $v_d^*$.

During a step 208, the conversion module (d, q/α, β) 126 expresses the global setpoints $[v^*]$ in the reference α-β (the modules $127_1$ and $127_2$ are not used so that $v_\alpha^*$ is equal to $\overline{v_\alpha}^*$ and such that $v_\beta^*$ is equal to $\overline{v_\beta}^*$).

During a step 210, the output module 128 controls the inverter 110 such that the latter applies the global setpoints $[v^*]=v_A^*, v_B^*, v_C^*$ to respectively the stator phase windings A, B, C.

Thus, the global setpoints $[v^*]=v_A^*, v_B^*, v_C^*$ comprise, on the one hand, the main setpoints $[v_b^*]$ of which the application to the stator phase windings A, B, C generates a magnetic field $B_b$ rotating at the rotation frequency $f_b$, and, on the other hand, the testing setpoints $[v_h^*]$ of which the application to the stator phase windings A, B, C generates a test magnetic field $B_h$ varying periodically at the test frequency $f_h$ only directly in the direction of the rotating magnetic field $B_b$.

During a step 212, when the electrical machine 102 is controlled, the measurement device 112 measures the phase currents $[i]=i_A, i_B, i_C$ flowing through the stator phase windings A, B, C.

During a step 214, the conversion module (a, b, c/α, β) 116 converts the phase currents $[i]=i_A, i_B, i_C$ into phase currents $[i]=i_\alpha, i_\beta$.

During a step 216, the module 132 determines an amplitude spectrum S of an electrical quantity determined on the basis of at least one portion of the phase currents $[i]=i_\alpha, i_\beta$. In the described example, the electrical quantity is the component $i_\alpha$.

Figure 3:
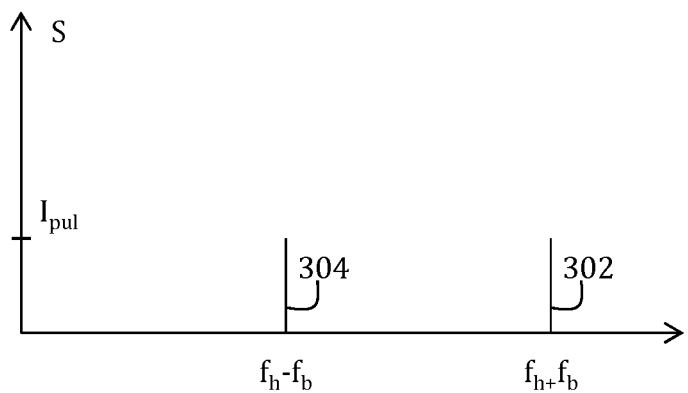
FIGS. 3 and 4 are amplitude spectra of an electrical quantity determined on the basis of at least some of the phase currents.

With reference to FIG. 3, the amplitude spectrum S comprises, with regard to high frequencies, a first peak 302 at the frequency $f_h+f_b$ and a second peak 304 at the frequency $f_h-f_b$. The two peaks 302, 304 have the same amplitude $I_{pul}$.

Indeed, as is well-known, at an established speed and neglecting the resistive effects, the high-frequency phase voltages $[v_h]=v_{dh}, v_{qh}$ and the high-frequency phase currents $[i_h]=i_{dh}, i_{qh}$ are connected by the following equation:

$$\begin{bmatrix} v_{dh} \\ v_{qh} \end{bmatrix} = \begin{bmatrix} Z_{dh} & 0 \\ 0 & Z_{qh} \end{bmatrix} \begin{bmatrix} i_{dh} \\ i_{qh} \end{bmatrix}$$

where $Z_{dh}=j2\pi f_h L_d$ and $Z_{qh}=j2\pi f_h L_q$.

Yet, in the present case, the high-frequency phase voltages $[v_h]=v_{dh}, v_{qh}$ are provided by the following equation:

$$\begin{bmatrix} V_{dh} \\ V_{qh} \end{bmatrix} = V_h \begin{bmatrix} \cos(2\pi\, f_h t) \\ 0 \end{bmatrix}$$

Furthermore, it is possible to express the high-frequency phase currents $[i_h]=i_{dh}, i_{qh}$ based on the high-frequency phase voltages $[v_h]=v_{dh}, v_{qh}$:

$$\begin{bmatrix} i_{dh} \\ i_{qh} \end{bmatrix} = \frac{V_h}{2\pi\, f_h L_d} \begin{bmatrix} \sin(2\pi\, f_h t) \\ 0 \end{bmatrix}$$

This equation can be transposed in the α-β reference:

$$\begin{bmatrix} i_{\alpha h} \\ i_{\beta h} \end{bmatrix} = I_{pul} \begin{bmatrix} \sin(2\pi\, f_b t + 2\pi\, f_h t) + \sin(2\pi\, f_b t - 2\pi\, f_h t) \\ \cos(2\pi\, f_b t - 2\pi\, f_h t) + \cos(2\pi\, f_b t + 2\pi\, f_h t) \end{bmatrix}$$

where $$I_{pul} = \frac{V_h}{4\pi\, f_h L_d}.$$

The component $i_{\alpha h}$ therefore comprises two peaks of amplitude $I_{pul}$ and of respective frequencies $f_b+f_h$ and $f_b-f_h$.

Thus, the amplitude spectrum S comprises, with regard to high frequencies, a peak at the frequency $f_b+f_h$ and a peak at the frequency $f_b-f_h$, both having the same amplitude $I_{pul}$.

Furthermore, based on the above equations, the amplitude $I_{pul}$ of the first peak 302 (and of the second peak 304) of the amplitude spectrum S is provided by the following equation:

$$I_{pul} = \frac{V_h}{4\pi\ f_h L_d}.$$

Once again, with reference to FIG. 2, during a step 218, the peak search module 134 searches, in the amplitude spectrum S, a peak present at the frequency $f_h+f_b$, finds the first peak 302 and determines the amplitude $I_{pul}$ thereof.

During a step 220, the module 136 determines the inductance $L_d$ based on the amplitude $I_{pul}$.

As described above, in the described example, the inductance $L_d$ is determined by the following equation:

$$L_d = \frac{V_h}{4\pi\ f_h I_{pul}}$$

During a second testing step 222, the following steps 224 to 238 are performed.

During a step 224, the setpoint module 124 determines the main setpoints $[v_b^*]=v_d^*, v_q^*$ based on the torque setpoint T* (the module 125 is not used such that $v_d^*$ is equal to $\overline{v_d}^*$. The torque setpoint T* is the same as in the first testing step 202.

During a step 226, the conversion module (d, q/α, β) 126 converts the main setpoints $[v_b^*]=v_d^*, v_q^*$ into main setpoints $[v_b^*]=\overline{v_\alpha}^*, \overline{v_\beta}^*$.

During a step 228, the rotating injection modules $127_1$, $127_2$ inject the testing setpoints $[v_h^*]$ into the main setpoints $[v_b^*]$. More specifically, the rotating injection modules $127_1$, $127_2$ add the components $v_{rot\_\alpha}$, $v_{rot\_\beta}$ respectively to the components $\overline{v_\alpha}^*$, $\overline{v_\beta}^*$ to provide global setpoints $[v^*]=v_\alpha^*, v_\beta^*$.

During a step 230, the output module 128 controls the inverter 110 such that the latter applies the global setpoints $[v^*]=v_A^*, v_B^*, v_C^*$ to respectively the stator phase windings A, B, C.

Thus, the global setpoints $[v^*]=v_A^*, v_B^*, v_C^*$ comprise, on the one hand, the main setpoints $[v_b^*]$ of which the application to the stator phase windings A, B, C generates a magnetic field $B_b$ rotating at the rotation frequency $f_b$ (the same as in the first test step 202), and, on the other hand, the testing setpoints $[v_h^*]$ of which the application to the stator phase windings A, B, C generates a test magnetic field $B_h$ rotating at the test frequency $f_h$.

During a step 232, when the electrical machine 102 is controlled, the measurement device 112 measures the phase currents $[i]=i_A, i_B, i_C$ is flowing through the stator phase windings A, B, C.

During a step 234, the conversion module (a, b, c/α, β) 116 converts the phase currents $[i]=i_A, i_B, i_C$ into phase currents $[i]=i_\alpha, i_\beta$.

During a step 236, the module 130 determines an amplitude spectrum S of an electrical quantity determined on the basis of at least one portion of the phase currents $[i]=i_\alpha, i_\beta$, this electrical quantity being the component $i_\alpha$ in the described example.

Figure 4:
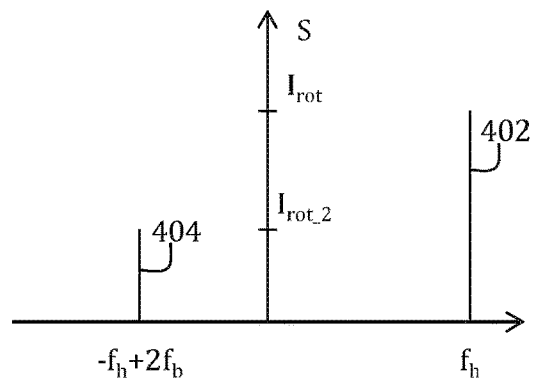

With reference to FIG. 4, the amplitude spectrum S comprises, with regard to high frequencies, a first peak 402 at the test frequency $f_h$ and a second peak 404 at the frequency $-f_h+2f_b$. The first peak 402 has an amplitude $I_{rot}$ and the second peak 404 has an amplitude $I_{rot\_2}$ different from amplitude $I_{rot}$.

Indeed, as is well known, at an established speed and neglecting the resistive effects, the high-frequency phase voltages $[v_h]=v_{dh}, v_{qh}$ and the high-frequency phase currents $[i_h]=i_{dh}, i_{qh}$ are connected by the following equation:

$$\begin{bmatrix} v_{dh} \\ v_{qh} \end{bmatrix} = \begin{bmatrix} Z_{dh} & 0 \\ 0 & Z_{qh} \end{bmatrix} \begin{bmatrix} i_{dh} \\ i_{qh} \end{bmatrix}$$

where $Z_{dh}=j2\pi f_h L_d$ and $Z_{qh}=j2\pi f_h L_q$.

This equation can be transposed in the α-β reference:

$$\begin{bmatrix} v_{\alpha h} \\ v_{\beta h} \end{bmatrix} = \begin{bmatrix} \Sigma Z + \Delta Z \cos(2\theta) & \Delta Z \sin(2\theta) \\ \Delta Z \sin(2\theta) & \Sigma Z - \Delta Z \cos(2\theta) \end{bmatrix} \begin{bmatrix} i_{\alpha h} \\ i_{\beta h} \end{bmatrix}$$

where $\Sigma Z = \frac{Z_{dh} + Z_{qh}}{2}$ and $\Delta Z = \frac{Z_{db} - Z_{qh}}{2}$.

Furthermore, it is possible to express the high-frequency phase currents $[i_h]=i_{\alpha h}, i_{\beta h}$ based on the high-frequency phase voltages $[v_h]=v_{\alpha h}, v_{\beta h}$:

$$\begin{bmatrix} I_{\alpha h} \\ I_{\beta h} \end{bmatrix} = \frac{1}{Z_{dh}Z_{qh}} \begin{bmatrix} \Sigma Z - \Delta Z \cos(2\theta) & -\Delta Z \sin(2\theta) \\ -\Delta Z \sin(2\theta) & \Sigma Z + \Delta Z \cos(2\theta) \end{bmatrix} \begin{bmatrix} V_{\alpha h} \\ V_{\beta h} \end{bmatrix}$$

Yet, in the present case, the high-frequency phase voltages $[v_h]=v_{\alpha h}, v_{\beta h}$ are provided by the following equation:

$$\begin{bmatrix} V_{\alpha h} \\ V_{\beta h} \end{bmatrix} = V_h \begin{bmatrix} \cos(2\pi\ f_h t) \\ \sin(2\pi\ f_h t) \end{bmatrix}$$

Thus, the high-frequency phase currents $[i_h]=i_{\beta h}$ are provided by the following equation:

$$\begin{bmatrix} I_{\alpha h} \\ I_{\beta h} \end{bmatrix} = \frac{V_h}{Z_{dh}\ Z_{qh}} \begin{bmatrix} \Sigma Z - \Delta Z \cos(2\theta) & -\Delta Z \sin(2\theta) \\ -\Delta Z \sin(2\theta) & \Sigma Z + \Delta Z \cos(2\theta) \end{bmatrix} \begin{bmatrix} \cos(2\pi\ f_h t) \\ \sin(2\pi\ f_h t) \end{bmatrix}$$

In particular, the component $i_{\alpha h}$ is provided by the equation:

$$i_{\alpha h} = \frac{V_h}{Z_{dh}\ Z_{qh}} (\Sigma Z \cos(2\pi\ f_h t) - \Delta Z \cos(-2\pi\ f_h t + 2\theta))$$

This equation can also be written in the form:

$$i_{\alpha h} = I_{rot} \cos(2\pi\ f_h t) + I_{rot\_2} \cos(-2\pi\ f_h t + 4\pi\ f_b t)$$

where $I_{rot} = \frac{(L_d + L_q)V_h}{4\pi\ f_h L_d L_q}$ and $I_{rot\_2} = \frac{(L_d - L_q)V_h}{4\pi\ f_h L_d L_q}$.

Thus, the component $i_{\alpha h}$ comprises a peak at the frequency $f_h$ and a peak at the frequency $-f_h+2f_b$, with respective amplitudes $I_{rot}$ and $I_{rot\_2}$.

Thus, the amplitude spectrum S comprises, with regard to high frequencies, a peak at the frequency $f_h$ and a peak at the frequency $-f_h+2f_b$, with respective amplitudes $I_{rot}$ and $I_{rot\_2}$.

Furthermore, based on the above equations, the amplitudes $I_{rot}$ and $I_{rot\_2}$ of the first and second peaks 402, 404 of the amplitude spectrum S are provided by the following equations:

$$I_{rot} = \frac{(L_d + L_q)V_h}{4\pi\ f_h L_d L_q}$$

$$I_{rot\_2} = \frac{(L_d - L_q)V_h}{4\pi\ f_h L_d L_q}$$

Once again with reference to FIG. 2, during a step 238, the peak search module 134 searches, in the amplitude spectrum S, a peak present at the frequency $f_h$, finds the first peak 402 and determines the amplitude $I_{rot}$ thereof.

During a step 240, the module 136 determines the inductance $L_q$ based on the amplitude $I_{rot}$, as well as the inductance $L_d$.

As described above, in the described example, the inductance $L_q$ is determined by the following equation:

$$L_q = -\frac{V_h}{-4\pi\ f_h I_{rot} + \frac{V_h}{L_d}}$$

where $L_d$ is the direct inductance determined at the step 220.

In a specific embodiment, the method 200 is repeated several times with a different torque setpoint T*. Furthermore, at each implementation of the method 200, the inductances $L_d$, $L_q$ are recorded with the corresponding main phase currents $[i_b]=i_{b\_d}, i_{b\_q}$.

Figure 5:
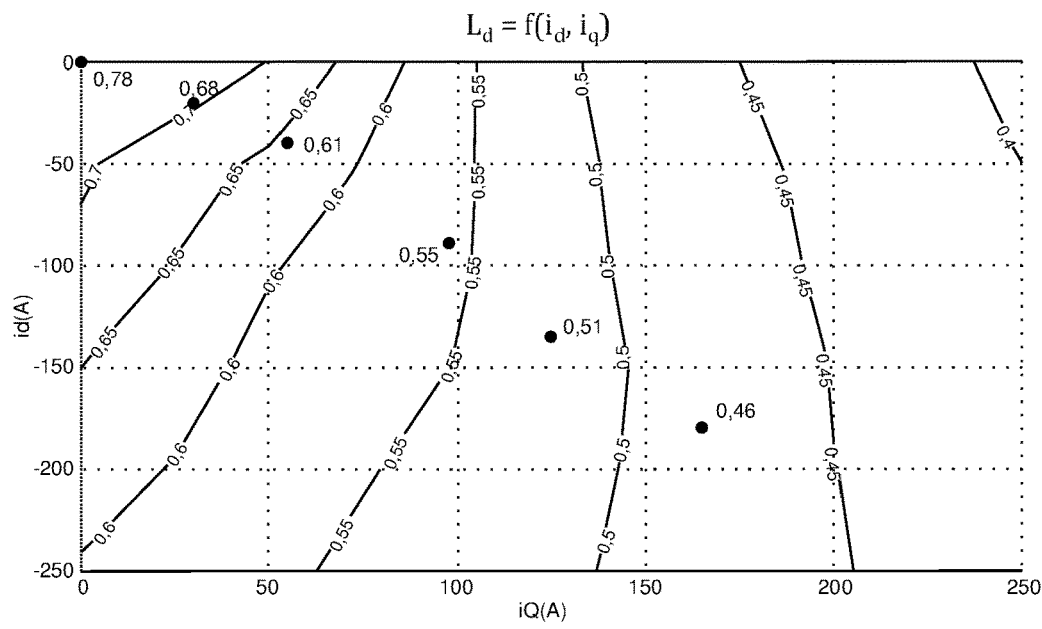
FIG. 5 shows the mapping of the inductances $L_d$, $L_q$, based on the phase currents.
Figure 5:
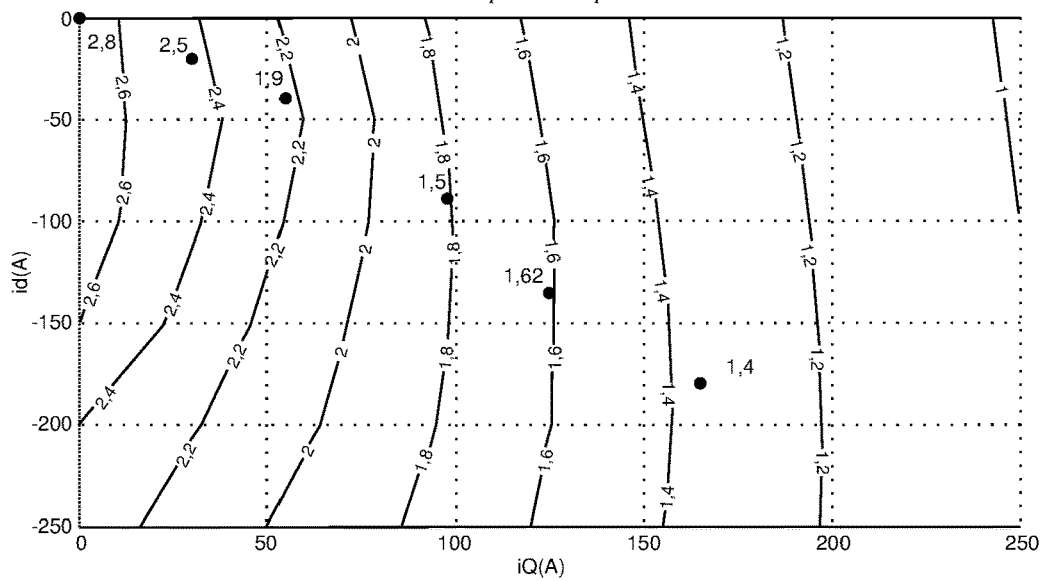

Thus, it is possible to obtain mappings associating the phase currents with the direct inductance $L_d$ and the quadrature inductance $L_q$, or to correct existing mappings (see FIG. 5, where the measurement points are indicated by black circles). Such mappings are used to design a setpoint module (such as the setpoint module 124) adapted to the electrical machine 102 to provide accurate controlling of the electrical machine 102. Such an adapted control module is then implemented in a control device configured to be used for production purposes, which is similar to the device 114, with the exception that it does not comprise the injection modules 125, 127$_1$, 127$_2$ or the modules 132, 134, 136 that are used to determine the inductances $L_d$, $L_q$.

Figure 6:
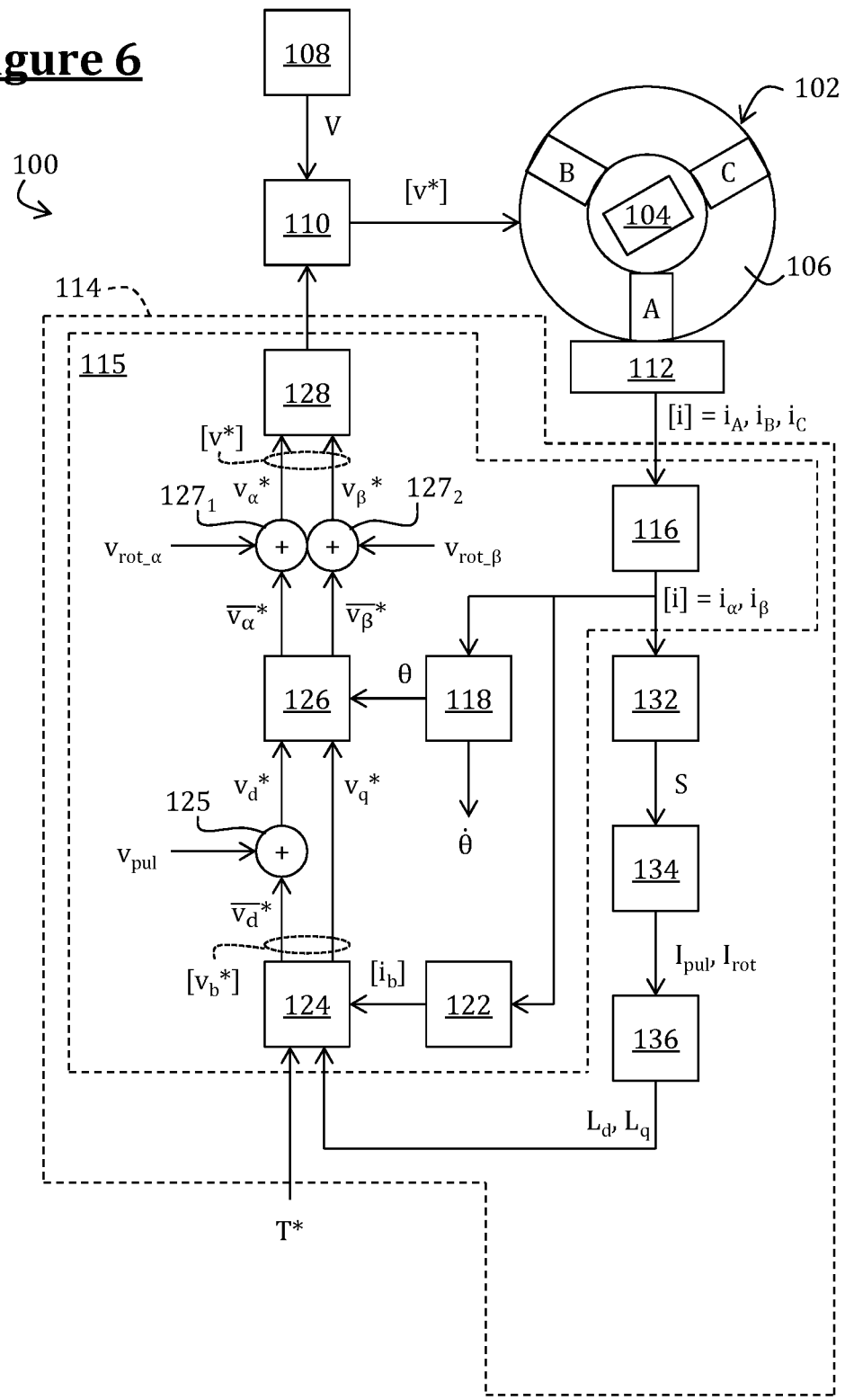
FIGS. 6 and 7 are functional diagrams of different alternatives of the electric system according to the invention.

Alternatively, with reference to FIG. 6, the determination of the inductances $L_d$, $L_q$ is used by the setpoint module 124 to establish the main setpoints $[v_b^*]$ from the main currents $[i_b]$ and the determined inductances $L_d$, $L_q$. In this case, $L_d$, $L_q$ are regularly updated, for example every day or every week. Thus, it is possible to consider the deviations of the inductances $L_d$, $L_q$, for example, caused by wear of the electrical machine 102, to control the electrical machine 102.

Figure 7:
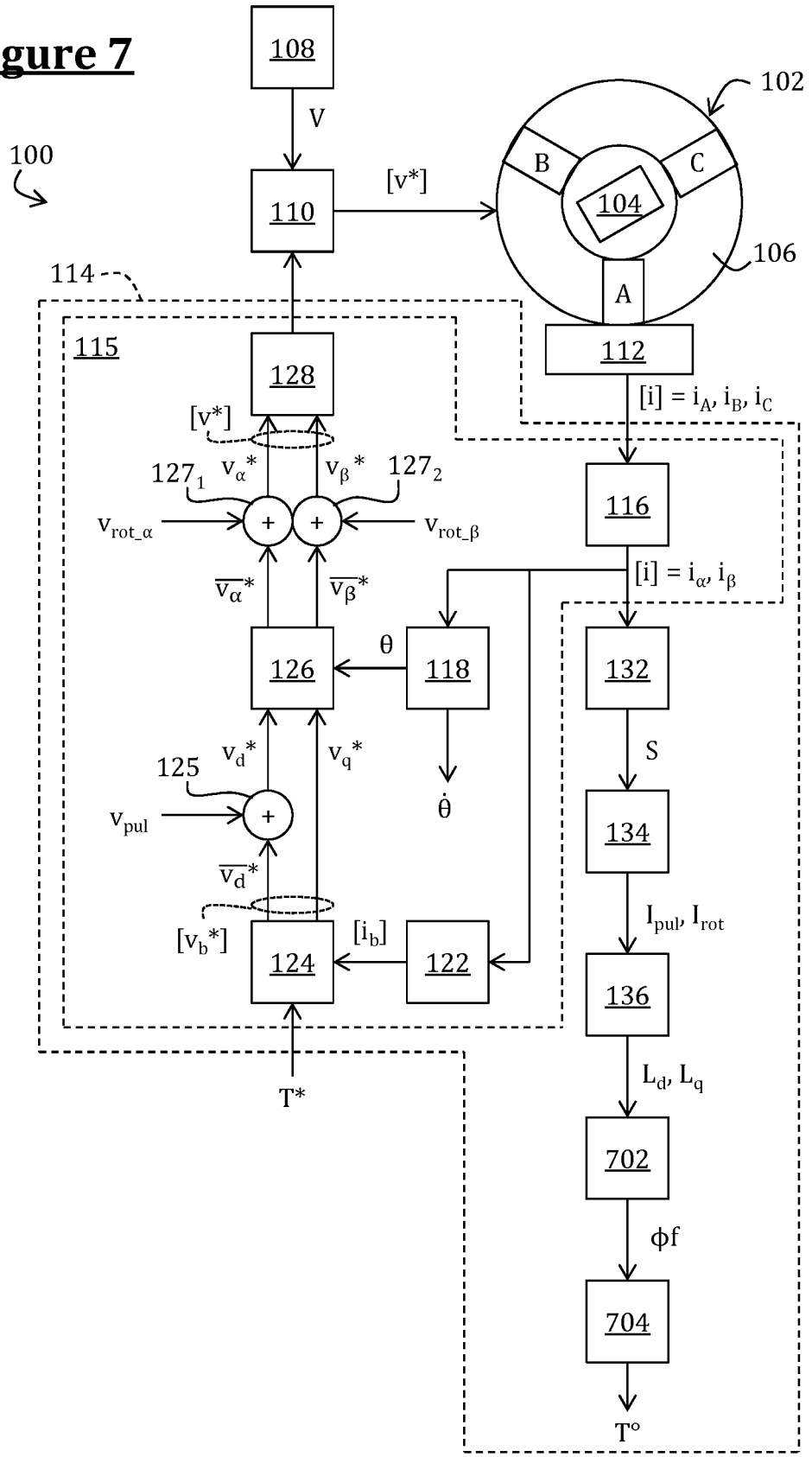

With reference to FIG. 7, in another embodiment, the device 114 comprises a flow determination module 702 designed to determine a rotor flux $\phi f$ from the inductances $L_d$, $L_q$. For example, the components $\phi f_d$, $\phi f_q$ of the rotor flux $\phi f$ in the d-q reference are determined with the following equations:

$$\phi f_d = \phi_d - L_d i_{b,d}$$

$$\phi f_q = \phi_q - L_q i_{b,q}$$

where $\phi_d$, $\phi_q$ are the total flux leakages, which are known.

Furthermore, the device 114 comprises a temperature determination module 704 designed to determine a temperature T° of the electrical machine (102) based on the rotor flux $\phi f$. For example, the temperature T° is provided by the following equation:

$$T° = k|\phi f|$$

where k is a known constant and $|\phi f| = \sqrt{\phi f_d^2 + \phi f_q^2}$.

Naturally, the two modules 702, 704 can be combined into one single module to determine directly the temperature T° of the electrical machine 102 from the inductances $L_d$, $L_q$.

The present invention is not limited to the embodiment described above, but is, in fact, defined by the claims below. It will appear as clear to a person skilled in the art that modifications can be made thereto.

For example, the estimation module 118 could be designed to estimate the angular position θ of the rotor 104 based on the phase currents $[i]=i_A, i_B, i_C$. In this case, the conversion module 116 is removed and the estimation module 118 receives directly the phase currents $[i]=i_A, i_B, i_C$ is measured by the measurement device 112.

Furthermore, the angular position θ can be expressed in the form of the two variables sin(θ) and cos(θ). Indeed, the angular position θ is generally used in the conversion module (d, q/α, β) 126 in the form of the two variables sin(θ) and cos(θ). Furthermore, the use of the two variables sin(θ) and cos(θ) makes it possible to avoid the modulo 2π error (i.e. the confusion between θ and θ+2π).

Furthermore, only steps 222 to 240 could be carried out to determine the direct inductance $L_d$ and the quadrature inductance $L_q$. In this case, the peak search module 134 searches for the peaks present at the frequencies $f_h$ and $-f_h+2f_b$, finds the first peak 402 and the second peak 404 and determines the amplitudes $I_{rot}$, $I_{rot\_2}$ thereof. Furthermore, the inductance determination module 136 would determine the direct inductance $L_d$ and the quadrature inductance $L_q$ by solving the following system of two equations with two unknown variables:

$$I_{rot} = \frac{(L_d + L_q)V_h}{4\pi\ f_h L_d L_q}$$

$$I_{rot\_2} = \frac{(L_d - L_q)V_h}{4\pi\ f_h L_d L_q}$$

Furthermore, the test frequency $f_h$ could be of the same magnitude as the rotation frequency $f_b$. In this case, other equations linking the amplitude of one or more peaks of the amplitude spectrum S are used to determine the inductances $L_d$, $L_q$. These other equations can easily be determined by a person skilled in the art, as needed.

Moreover, the terms used in the claims must not be understood as being limited to the elements of the embodiment described above, but must, on the contrary, be understood as covering all equivalent elements that a person skilled in the art can deduce from their general knowledge.

REFERENCES

Electric system 100
Electrical machine 102
Rotor 104
Stator 106
Direct voltage source 108
Inverter 110
Measurement device 112
Inductance determination device 114
Control module 115
Conversion module (a, b, c/α, β) 116
Angular estimation module 118
Main current estimation module 122
Setpoint module 124
Pulsating injection module 125
Conversion module (d, q/α, β) 126
Rotating injection modules 127₁, 127₂
Output module 128
Spectral analysis module 132
Peak search module 134
Inductance determination module 136

The invention claimed is:

1. A method for determining a direct inductance and a quadrature inductance of an electrical machine, the method comprising:
at least one testing step comprising:
controlling the electrical machine so that a stator of the electrical machine generates a magnetic field comprising:
a first magnetic field rotating at a first rotation frequency, so as to rotationally drive a rotor of the electrical machine, and
a second magnetic field, called test magnetic field, that varies periodically at a second frequency, called test frequency,
measuring at least one portion of the phase currents flowing through the stator windings of the electrical machine during controlling of the electrical machine,
determining an amplitude spectrum of a given electrical quantity determined on the basis of at least one portion of the phase currents,
searching in the amplitude spectrum for at least, one peak present at a frequency that is dependent on the test frequency,
determining an amplitude of each peak found,
determining the direct inductance and the quadrature inductance from the amplitudes of two peaks found in the one or more testing steps.

2. The method of claim 1, wherein the test frequency is greater than the rotation frequency, preferably ten times greater.

3. The method of claim 1, wherein the at least one testing step comprises a first testing step wherein the test magnetic field varies only in a direct direction of the first magnetic field.

4. The method of claim 3, wherein, during the first testing step, a peak is sought at a sum of the rotation frequency and the test frequency.

5. The method of claim 3, wherein, during the first testing step, controlling of the electrical machine comprises:
determining the phase voltage setpoints, called global setpoints, said global setpoints comprising setpoints, called testing setpoints, of which the application to the stator phase windings of the electrical machine configured to generate the test magnetic field, the testing setpoints comprising a component in a direct direction, which is sinusoidal to the test frequency, and a component in the quadrature direction, which is zero,
applying the global setpoints, respectively to the stator phase windings of the electrical machine.

6. The method of claim 5, wherein the direct inductance is determined with the following equation:

$$L_d = \frac{V_h}{4\pi f_h I_{pul}}$$

where:
$I_{pul}$ is the amplitude of the peak found at the sum of the rotation frequency and at the test frequency,
$V_h$ and $f_h$ are respectively the amplitude, and the frequency of the sinusoidal component in the direct direction of the testing setpoints.

7. The method of claim 6, wherein, during the second testing step, a peak is sought at the test frequency.

8. The method of claim 7, wherein the two components of the testing setpoints have the same test amplitude, and wherein the quadrature inductance is determined by the following equation:

$$L_q = -\frac{V_h}{-4\pi f_h I_{rot} + \frac{V_h}{L_d}}$$

where:
$I_{rot}$ is the amplitude of the peak found at the test frequency,
$V_h$ and $f_h$ are respectively the amplitude and the frequency of the two components of the testing setpoints.

9. The method of claim 1, wherein the at least one testing step comprises a second testing step wherein the test magnetic field is a magnetic field rotating at the test frequency.

10. The method of claim 9, wherein, during the second testing step, controlling of the electrical machine comprises the determination of the global setpoints of the phase voltages comprising testing setpoints, the application of which to the stator phase windings is configured to generate the test magnetic field, these testing setpoints comprising a component along a first axis of a fixed reference with respect to the stator, which is sinusoidal to the test frequency, and a component along a second axis of the fixed reference, which is co-sinusoidal to the test, frequency.

11. A computer program that can be downloaded from a communication network and/or stored on a support that is readable by a computer and/or executable by a processor, wherein it comprises instructions for the execution of the steps of the method according to claim 1, when said program is executed on a computer.

12. A device for determining a direct inductance and a quadrature, inductance of an electrical machine, the device comprising:
a control module of an inverter designed to respectively provide phase voltages to the stator phase windings of the electrical machine, such that a stator of the electrical machine generates a magnetic field comprising:
a first magnetic field rotating at a rotation frequency, so as to rotationally drive a rotor (104) of the electrical machine, and
a second magnetic field, called test magnetic field, that varies periodically at a second frequency, called test frequency, a module for determining an amplitude spectrum with an electrical quantity determined from at least one portion of the phase currents flowing through the stator phase windings of the electrical machine during control of the electrical machine, a module for searching in the amplitude spectrum for at least one peak present at a frequency that is dependent on the test frequency and for determining an amplitude for each peak found, a module designed to determine the direct inductance and the quadrature inductance based on the amplitudes of the two peaks found.

* * * * *